Feb. 18, 1958  J. P. GREENING  2,824,277
VOLTAGE REGULATOR
Filed Sept. 24, 1953

*INVENTOR.*
J. P. GREENING
BY
*Hudson & Young*
ATTORNEYS

United States Patent Office 2,824,277
Patented Feb. 18, 1958

2,824,277

VOLTAGE REGULATOR

John P. Greening, Bartlesville, Okla., assignor to Phillips Petroleum Company, a corporation of Delaware Application September 24, 1953, Serial No. 382,114

9 Claims. (Cl. 323—23)

This invention relates to voltage regulators.

Voltage regulators are widely used to stabilize the output of direct current power supplies, i. e., to maintain a constant output voltage despite variations in load current or in the voltage of the alternating current source connected to the power supply. Considerable difficulty has been encountered in obtaining effective regulation where the load variations are large, particularly where large load variations are combined with substantial variations in line voltage. This is particularly true of power supplies coupled to circuits for handling or amplifying rectangular waves where the variation from minimum to maximum load takes place in an extremely short time.

It is an object of this invention to provide an improved voltage regulator circuit.

It is a further object to provide a system capable of maintaining an output voltage constant within the range of 0.03 percent or less, despite variations in the power supply output voltage of as much as 50 to 100 volts or more.

It is a still further object to provide a voltage regulator which is extremely reliable in operation and utilizes a minimum number of standard components.

Figure 1:
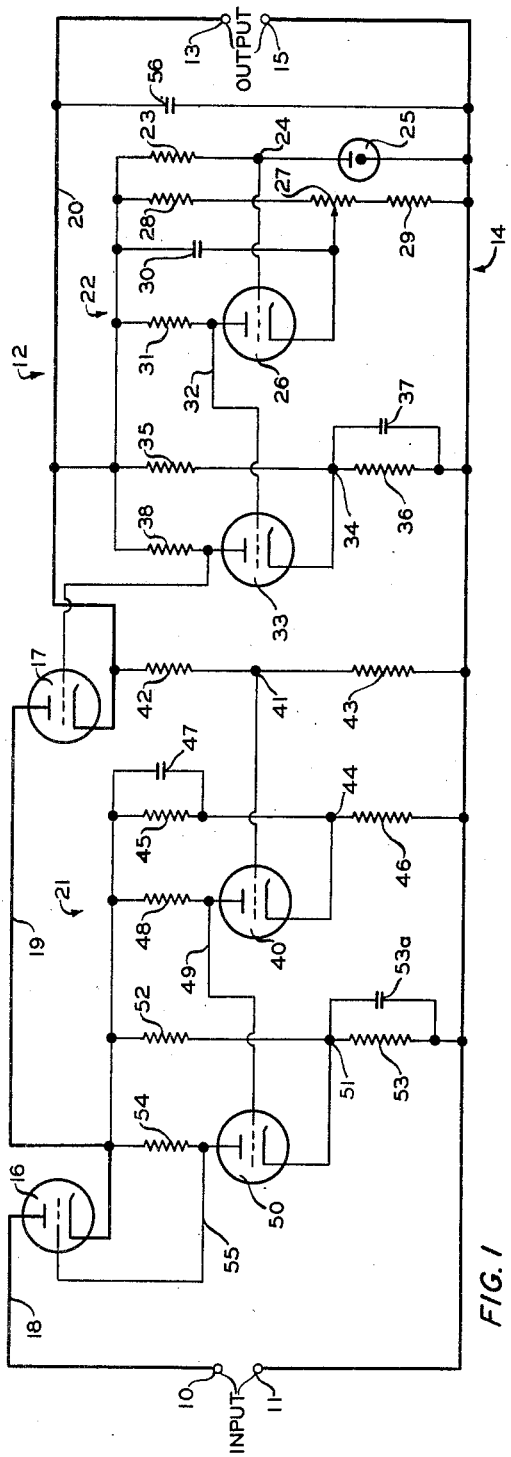
Figure 2:
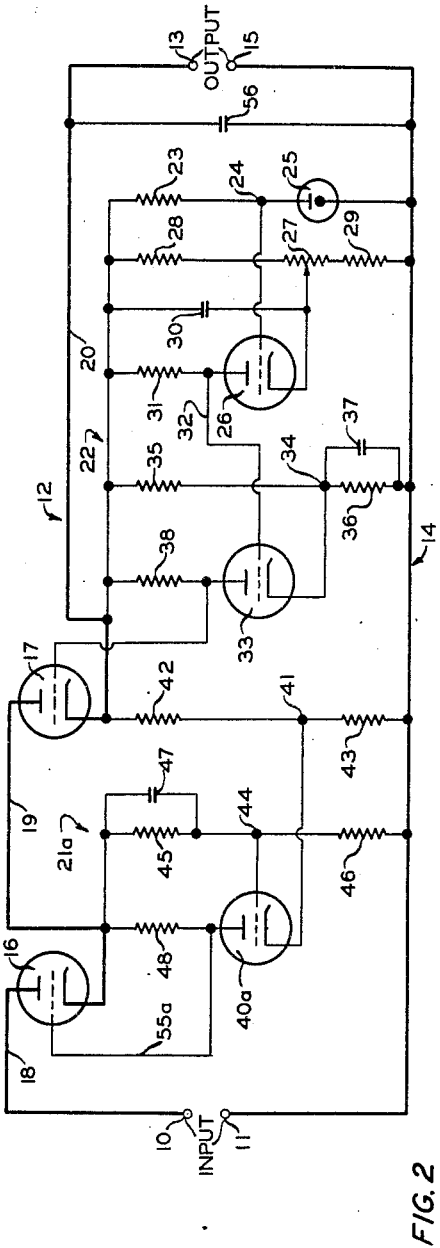

Various other objects, advantages, and features of the invention will become apparent from the following detailed description taken in conjunction with the accompanying drawings, in which:

Figure 1 is a schematic circuit diagram of a voltage regulator constructed in accordance with the invention; and Figure 2 is a schematic diagram of a modified voltage regulator circuit.

Referring now to Figure 1, unregulated direct current voltage, as from a power supply, is fed to input terminals 10, 11. Terminal 10 is connected by a positive power supply line 12 to an output terminal 13 and terminal 11 is connected by a negative supply line 14 to an output terminal 15. A first voltage regulator tube 16 and a second voltage regulator tube 17 are connected in series in line 12, thereby dividing it into an input section 18, an intermediate section 19, and an output section 20. Each of the voltage regulator tubes includes an anode, a cathode, and at least one control electrode, for example, a control grid. As shown, the voltage regulator tubes are connected in positive supply line 12 but, in some embodiments of the invention, they can be connected with reversed polarity in negative supply line 14, it being understood that a proper negative potential to operate the tube would be required in such a system.

The internal resistance of tubes 16, 17 is separately regulated by control circuits generally indicated by reference numerals 21 and 22. In each circuit, the output voltage of one regulator section is compared with a standard voltage to produce a resultant voltage representative of the difference between the standard and output voltage, this resultant voltage being used to adjust the internal resistance of the associated tube 16 or 17 so as to maintain a constant voltage at the regulator output terminals 13 and 15.

To this end, control circuit 22 incorporates a fixed resistance 23 having one terminal connected to section 20 of the positive supply line. The other terminal of resistor 23 is connected by a lead 24 to the anode of a gas type cold cathode regulator tube 25, the cathode of which is connected to line 14. Tube 25 functions as a constant voltage device and maintains a constant potential at lead 24 which is connected to the control grid of a vacuum tube 26. The cathode of tube 26 has impressed thereon a voltage proportional to that appearing between output section 20 and lead 14. To this end, the cathode is connected to the contactor of a potentiometer 27 having one fixed terminal connected to section 20 through a fixed resistance 28 and its other fixed terminal connected to line 14 by a fixed resistance 29, a bypass condenser 30 being connected between the contactor of the potentiometer and section 20. Units 27, 28, and 29 effectively constitute a potentiometer by which a variable fraction of the output voltage can be impressed upon the cathode of tube 26.

The anode of tube 26 receives positive supply voltage through a fixed resistor 31 connected to section 20, and the anode is further coupled by a lead 32 to the control grid of an amplifier tube 33. A predetermined cathode potential is maintained on this tube by connection of the cathode to a junction 34 of a voltage divider unit formed by a fixed resistance 35 connected to section 20 and a fixed resistance 36 connected to line 14, resistance 36 having a bypass condenser 37 connected in parallel therewith. An operating potential is supplied to the anode of tube 33 through a fixed resistance 38 connected to section 20, and the anode of this tube is further connected to the control grid of voltage regulator tube 17.

Control section 21 obtains its reference voltage from section 20 and, to this end, the control grid of a vacuum tube 40 is connected to a junction 41 between a pair of fixed resistors 42 and 43 connected, respectively, to section 20 and output line 14. The cathode of tube 40 receives a voltage which is a predetermined fraction of the voltage appearing between section 19 and line 14.

To this end, the cathode is connected to a junction 44 between two fixed resistances 45 and 46 which are connected, respectively, to section 19 and line 14. A bypass condenser 47 is connected in parallel with fixed resistor 45. A positive operating potential is supplied to the anode of tube 40 from section 19 through a voltage dropping resistor 48, and the anode of this tube is coupled by a lead 49 to the control grid of an amplifier tube 50. A predetermined operating potential is supplied to the cathode of tube 50 by virtue of a connection between this cathode and a junction 51 between a pair of fixed resistances 52 and 53 which are connected, respectively, to section 19 and line 14. An operating potential is supplied to the anode of tube 50 from section 19 through a fixed voltage dropping resistor 54 and the anode of this tube is further connected by a lead 55 to the control grid of voltage regulator tube 16.

In the operation of the circuit of Figure 1, a constant steady reference voltage is impressed upon the control grid of tube 26 from the anode of regulator 25, and a voltage representative of the output of the system is impressed upon the cathode of this tube. Consequently, the anode current of this tube is representative of the difference between these two voltages, and the anode voltage, which is applied to the control grid of amplifier tube 33, is inversely responsive to said such voltage difference. Accordingly, the anode voltage of tube 33, which is impressed upon the tube 17, is again directly representative of the difference or "error" voltage between the regulator output and the standard or reference voltage. The signal thus applied to the control grid of regulator tube 17 varies its internal resistance in such fashion as to eliminate the error voltage and make the regulator output voltage proportional to the reference voltage.

The desired output voltage can, of course, be adjusted by moving the contactor of potentiometer 27.

In similar fashion, tube 40 produces an anode current inversely proportional to the voltage difference between intermediate section 19 and line 14 on the one hand and between section 20 and line 14 on the other hand. This voltage is amplified and reversed in phase by tube 50, the resulting amplified voltage being applied to the control grid of regulator tube 16, thereby causing the internal resistance of this tube to vary in such fashion as to cause the voltage at an intermediate section 19 to stabilize at an intermediate value, between the voltages at sections 18 and 20.

The voltage regulator circuit of the invention offers a number of important advantages. In voltage regulator systems where a control voltage is amplified and applied to a regulator tube connected in series in the line to be regulated, complete compensation is possible only when the amplified gain is extremely high, i. e., approaches infinity. With a single amplifier, drift in the first stage of the control amplifier resulting, for example, from filament instability and resulting variations of electron emission, microphonics in the first stage of the amplifier, the inherent limitation of high frequency response in a high gain amplifier, and the necessity for operating the series regulator tube within its current and voltage ratings all impose limits upon the gain obtainable. With the system of this invention, these limitations are completely or substantially eliminated in that the gain of the output section 22 is, in effect, multiplied by the gain of the intermediate section 21 to provide a total very high amplification factor with consequent minimization of the limiting factors present where only one amplifier is used.

Further, it will be noted that the reference voltage supplied to control circuit 21 is not a steady fixed voltage but, rather, is derived from the voltage appearing at output section 20. As a result, the correcting action is advantageously balanced between the two regulator stages. In particular, assuming that a voltage increment of 100 volts must be corrected by the regulator circuit, with the described circuit, a correction of approximately 98 volts will be obtained through the action of series regulator tube 16 whereas the final correction from a two volt limit to the 0.03 percent regulation obtainable with the system is performed by tube 17. If a constant voltage were fed to control circuit 21, substantially all the regulating action would be performed by tube 16, and tube 17 would not contribute as effectively to the regulating action.

Further, the use of voltage divider 42, 43 to supply the reference signal to control unit 21 is advantageous in that a higher grid potential can be impressed upon this tube than would be the case if the control grid of the tube 40 were connected, for example, to lead 24. As a result, the sensitivity of the regulator is increased in that a relatively large fraction of the output voltage at intermediate section 19 can be compared with the reference voltage for control unit 21. This results from the fact that the voltage obtainable by the voltage divider 42, 43 is substantially greater than the voltage obtainable at the anode of regulator 25, and the voltage obtainable from the regulator 25 cannot be increased by insertion of a cathode resistor, as this would destroy its constant voltage characteristics.

In some instances, it is desirable to connect a condenser 56 in parallel with output terminals 13 and 15. The energy stored in this condenser aids in preventing changes in output voltage resulting from abrupt changes in current drawn by the load. Finally, condensers 30 and 47 offer a low impedance to any ripple voltage present in the power supply output, and the respective control systems, responsive to such ripple voltages, effect changes in the internal impedances of tubes 16 and 17 tending to cancel out such ripple voltages and provide an extremely steady direct current output.

The circuit shown in Figure 2 is similar in many respects to the circuit described in connection with Figure 1 and, consequently, like parts are indicated by similar reference numerals. The circuit differs from that of Figure 1 in that no amplifier is provided in the control section 21a corresponding to tube 50 in control section 21 of Figure 1, the anode of tube 40a being directly coupled to the control grid of regulator tube 16 by a lead 55a. In order to obtain the proper phase for the correction signals applied to the control grid of regulator tube 16, therefore, vacuum tube 40a has its control grid and cathode connections reversed with respect to the corresponding connections of tube 40. That is, the control grid of this tube is connected to the junction 44 rather than to junction 41 while the cathode of the tube is connected to junction 41 rather than to junction 44. In this manner, the phase reversal effected by elimination of tube 50 is compensated for by reversal of cathode and control grid connections of tube 40a. Except for the omission of the amplifying function of tube 50, the operation of the circuit is as described in connection with Figure 1.

While the invention has been described in connection with a present, preferred embodiment thereof, it is to be understood that this description is illustrative only and is not intended to limit the invention.

I claim:

1. A voltage regulator comprising, in combination, a positive supply line, a negative supply line, a pair of voltage regulator tubes connected in series in one of said lines, each tube including at least an anode, a cathode, and a control electrode, said tubes dividing said one line into an input section, an intermediate section, and an output section, means for producing a steady reference voltage, means for comparing said reference voltage with the voltage between said output section and said other supply line to provide a first resultant voltage, means applying said rseultant voltage to the control electrode of one of said tubes, means for comparing the voltage between said intermediate section and said other supply line with the voltage between said output section and said other supply line to produce a second resultant voltage, and means for applying said second resultant voltage to the control electrode of the other of said tubes.

2. A voltage regulator comprising, in combination, a positive power supply line, a negative supply line, first and second voltage regulator tubes connected in series in one of said lines, each tube including at least an anode, a cathode, and a control electrode, said tubes dividing said one line into an input section, an intermediate section, and an output section, means for producing a steady reference voltage, means for comparing said reference voltage with the voltage between said output section and said other supply line to provide a first resultant voltage, means applying said resultant voltage to the control electrode of said second tube, means for comparing the voltage between said intermediate section and said other supply line with the voltage between said output section and said other supply line to produce a second resultant voltage, and means for applying said second resultant voltage to the control electrode of said first tube.

3. A voltage regulator comprising, in combination, a positive power supply line, a negative supply line, first and second voltage regulator tubes connected in series in said positive line, each tube including at least an anode, a cathode, and a control electrode, said tubes dividing said positive line into an input section, an intermediate section, and an output section, means for producing a steady reference voltage, means for comparing said reference voltage with the voltage between said output section and said negative supply line to provide a first resultant voltage, means applying said resultant voltage to the control electrode of said second tube, means for comparing the voltage between said intermediate section and said negative supply line with the voltage between said output section and said negative supply line to produce a second resultant voltage, and means for applying said second resultant voltage to the control electrode of said first tube.

4. A voltage regulator comprising, in combination, a positive supply line, a negative supply line, a first voltage regulator tube and a second voltage regulator tube connected in series in one of said lines, each tube including an anode, a cathode, and a control grid, said tubes dividing said one line into an input section, an intermediate section, and an output section, a unit including a constant voltage device and a resistor connected in series between said output section and said other line, a potentiometer having its fixed terminals connected to said output section and said other line, an amplifier, means for feeding the output of said amplifier to the control grid of said second regulator tube, a vacuum tube having an anode, a cathode, and a control grid, leads connecting the input circuit of said amplifier in the anode-cathode circuit of said vacuum tube, a lead connecting the contactor of said potentiometer to one of the other electrodes of said vacuum tube, a lead connecting the junction between said constant voltage device and said resistor to the other electrode of said vacuum tube, a voltage divider connected between said output section and said other lead, a voltage divider connected between said intermediate section and said other lead, a second amplifier, means for feeding the output of said second amplifier to the control grid of said first voltage regulator tube, a second vacuum tube having an anode, a cathode, and a control grid, leads connecting the input of said second amplifier in the anode-cathode circuit of said second vacuum tube, and leads connecting taps on the respective voltage dividers to the respective cathode and control grid of said second vacuum tube.

5. A voltage regulator comprising, in combination, a positive supply line, a negative supply line, a first voltage regulator tube and a second voltage regulator tube connected in series in said positive line, each tube including an anode, a cathode, and a control grid, said tubes dividing said positive line into an input section, an intermediate section, and an output section, a unit including a constant voltage device and a resistor connected in series between said output section and said negative line, a potentiometer having its fixed terminals connected to said output section and said negative line, a vacuum tube having an anode, a cathode, and a control grid, means coupling the control grid of said second regulator tube to the anode-cathode circuit of said vacuum tube, a lead connecting the contactor of said potentiometer to the cathode of said vacuum tube, a lead connecting the junction between said constant voltage device and said resistor to the control grid of said vacuum tube, a voltage divider connected between said output section and said negative lead, a voltage divider connected between said intermediate section and said negative lead, a second vacuum tube having an anode, a cathode, and a control grid, means coupling the control grid of said first regulator tube to the anode-cathode circuit of said second vacuum tube, and leads connecting taps on said voltage dividers to the respective cathode and control grid of said second vacuum tube.

6. A voltage regulator in accordance with claim 5 in which said constant voltage device is a gas type cold cathode regulator tube.

7. A voltage regulator comprising, in combination, a positive supply line, a negative supply line, a first voltage regulator tube and a second voltage regulator tube connected in series in said positive line, each tube including an anode, a cathode, and a control grid, said tubes dividing said positive line into an input section, an intermediate section, and an output section, a unit including a constant voltage device and a resistor connected in series between said output section and said negative line, a potentiometer having its fixed terminals connected to said output section and said negative line, a one stage amplifier, means for feeding the output of said amplifier to the control grid of said second regulator tube, a vacuum tube having an anode, a cathode, and a control grid, leads connecting the input circuit of said amplifier in the anode-cathode circuit of said vacuum tube, a lead connecting the contactor of said potentiometer to the cathode of said vacuum tube, a lead connecting the junction between said constant voltage device and said resistor to the control grid of said vacuum tube, a first voltage divider connected between said output section and said negative lead, a second voltage divider connected between said intermediate section and said negative lead, an amplifier tube having an anode, a cathode, and a control grid, a lead connecting the anode of said amplifier tube to the control grid of said first voltage regulator tube, a second vacuum tube having an anode, a cathode, and a control grid, leads coupling the control grid of said second amplifier tube to the anode-cathode circuit of said second vacuum tube, and leads connecting taps on said first and second voltage dividers to the respective control grid and cathode of said second vacuum tube.

8. A voltage regulator comprising, in combination, a positive supply line, a negative supply line, a first voltage regulator tube and a second voltage regulator tube connected in series in said positive line, each tube including an anode, a cathode, and a control grid, said tubes dividing said positive line into an input section, an intermediate section, and an output section, a unit including a constant voltage device and a resistor connected in series between said output section and said negative line, a potentiometer having its fixed terminals connected to said output section and said negative line, a one stage amplifier, means for feeding the output of said amplifier to the control grid of said second regulator tube, a vacuum tube having an anode, a cathode, and a control grid, leads connecting the input circuit of said amplifier in the anode-cathode circuit of said vacuum tube, a lead connecting the contactor of said potentiometer to cathode of said vacuum tube, a lead connecting the junction between said constant voltage device and said resistor to the control grid of said vacuum tube, a first voltage divider connected between said output section and said negative lead, a second voltage divider connected between said intermediate section and said negative lead, a second vacuum tube having an anode, a cathode, and a control grid, a lead coupling the anode of said second vacuum tube to the control grid of said first regulator tube, and leads connecting taps on said first and second voltage dividers to the respective cathode and control grid of said second vacuum tube.

9. A voltage regulator comprising, in combination, a positive supply line, a negative supply line, a first voltage regulator tube and a second voltage regulator tube connected in series in one of said lines, each tube including an anode, a cathode, and a control grid, said tubes dividing said one line into an input section, an intermediate section, and an output section, a unit including a constant voltage device and a resistor connected in series between said output section and said other line, a potentiometer having its fixed terminals connected between said output section and said other line, an amplifier tube having an anode, a cathode, and a control grid, means for coupling the anode of said amplifier tube to the control grid of said second voltage regulator tube, a vacuum tube having an anode, a cathode, and a control grid, means coupling the anode of said vacuum tube to the control grid of said amplifier tube, a lead connecting the cathode of said vacuum tube to the contactor of said potentiometer, a lead connecting the junction between said constant voltage device and said resistor to the control grid of said vacuum tube, a first voltage divider connected between said output section and said other lead, a second voltage divider connected between said intermediate section and said other lead, a second vacuum tube having an anode, a cathode, and a control grid, means coupling the anode-cathode circuit of said second vacuum tube to the control grid of said first voltage regulator tube, a lead coupling a tap on said first voltage divider to one electrode of said second vacuum tube, and a lead coupling a tap on said second voltage divider to another electrode of said second vacuum tube.

References Cited in the file of this patent

UNITED STATES PATENTS

| | | |
|---|---|---|
| 2,318,644 | Tubbs | May 11, 1943 |
| 2,401,096 | Paradise et al. | May 28, 1946 |
| 2,629,854 | Williams | Feb. 24, 1953 |